Figure 1:
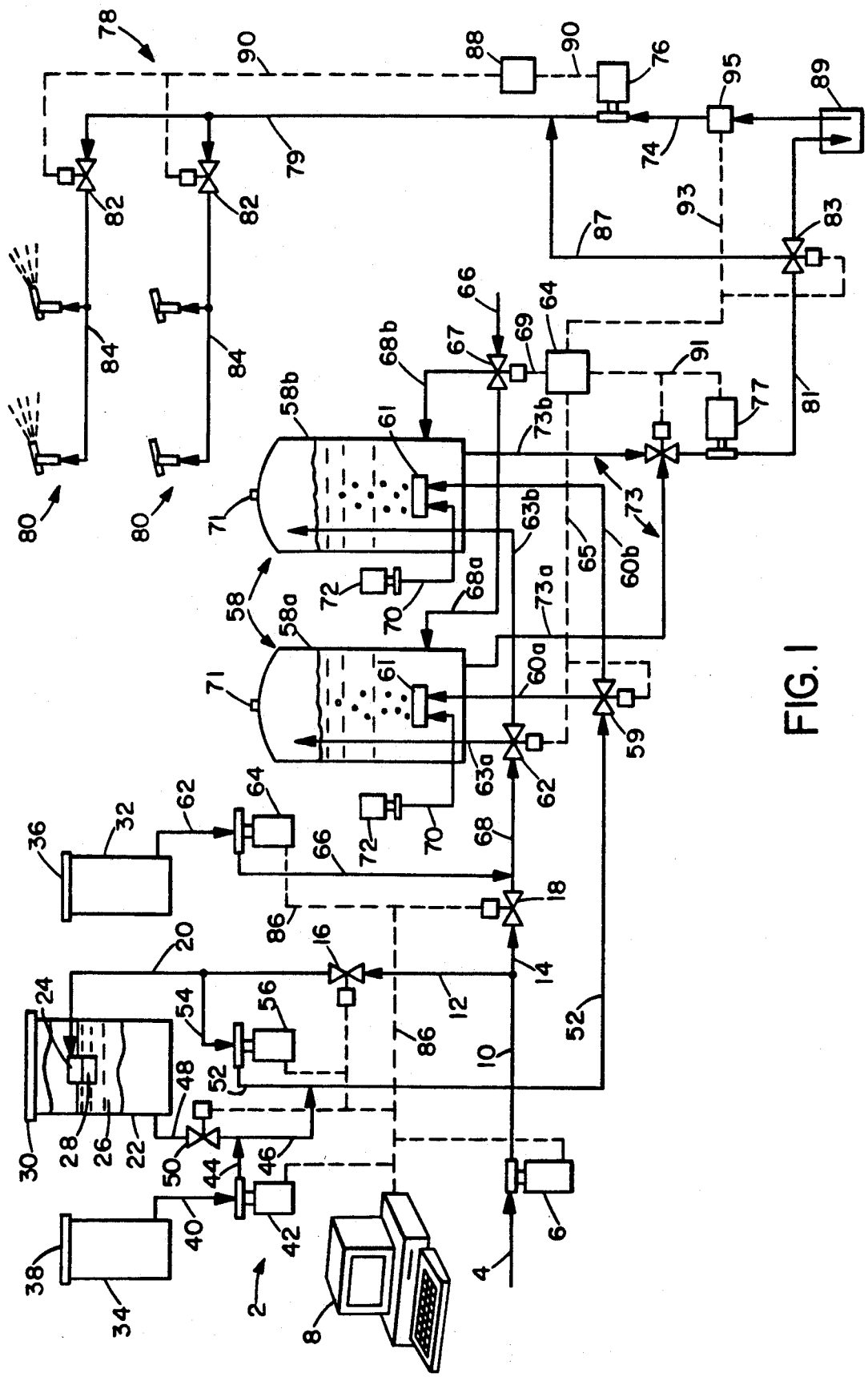

United States Patent [19]
Runyon

[11] Patent Number: 5,227,068
[45] Date of Patent: Jul. 13, 1993

[54] CLOSED APPARATUS SYSTEM FOR IMPROVING IRRIGATION AND METHOD FOR ITS USE

[75] Inventor: Larry K. Runyon, Temecula, Calif.
[73] Assignee: Eco-Soil Systems, Inc., San Diego, Calif.
[21] Appl. No.: 880,224
[22] Filed: May 8, 1992

Related U.S. Application Data

[63] Continuation-in-part of Ser. No. 782,437, Oct. 25, 1991.
[51] Int. Cl.$^5$ .............................................. A01C 21/00
[52] U.S. Cl. ..................................... 210/610; 210/747; 210/143; 210/170; 239/10; 239/310; 71/7; 71/9; 435/262
[58] Field of Search ............... 210/610, 611, 620, 631, 210/747, 170, 205, 257.1, 143; 239/10, 61, 310, 318; 71/6, 7, 9; 435/262, 264

[56] References Cited

U.S. PATENT DOCUMENTS

| | | | |
|---|---|---|---|
| 2,382,010 | 8/1945 | Hodges | 210/610 |
| 3,431,675 | 3/1969 | Moore | 210/611 |
| 3,592,386 | 7/1971 | Jschudy, Jr. | 239/10 |
| 3,733,028 | 5/1973 | McVez | 239/10 |
| 3,855,121 | 12/1974 | Gough | 210/610 |
| 3,920,552 | 11/1975 | Elkern | 210/205 |
| 4,209,388 | 6/1980 | DeFraites | 210/170 |
| 4,584,102 | 4/1986 | Bogart et al. | 210/610 |
| 4,695,384 | 9/1987 | Ripl et al. | 210/747 |
| 4,768,712 | 9/1988 | Terrell | 239/68 |
| 4,810,385 | 3/1989 | Hater et al. | 210/611 |
| 4,846,206 | 7/1989 | Peterson | 137/1 |
| 4,867,192 | 9/1989 | Terrell et al. | 239/69 |
| 4,895,303 | 1/1990 | Freyvogel | 239/68 |
| 4,917,304 | 4/1990 | Mazzei et al. | 239/324 |
| 4,925,564 | 5/1990 | Francis | 210/615 |
| 5,011,604 | 4/1991 | Wilde et al. | 210/747 |
| 5,135,174 | 8/1992 | Chaplinsky | 239/310 |

FOREIGN PATENT DOCUMENTS

2-107389 4/1990 Japan.

Primary Examiner—Stanley S. Silverman
Assistant Examiner—Christopher Upton
Attorney, Agent, or Firm—Brown, Martin, Haller & McClain

[57] ABSTRACT

A method and apparatus are described for providing improved irrigation to vegetation in open areas such as parks and golf courses, including providing improved microbiotic and nutrient supplies to such vegetation in a non-sterilized environment. In its method aspects, the invention comprises combining in an aqueous slurry effective amounts of first and second microorganisms, enzymes and nutrients, allowing the combined microorganisms to grow in a closed reservoir to reach levels of concentrations of the first and second microorganisms effective for irrigation, enhancement and nutrition of vegetation, and then applying the concentrated materials to the vegetation in a water slurry in quantities sufficient to effectively irrigate and provide nutrition to the vegetation and to provide it with protection against harmful microorganisms. Apparatus is described for the performance of the method, and includes an enhancement vessel adapted to retain the combined materials for a time sufficient for the first and second microorganisms to increase in concentration to provide a significant degree of nutrition and protection against harmful microorganisms to vegetation to which they are applied; and a conduit to convey the slurry to the vegetation and to apply it to the vegetation in effective quantities. Typical of the applications for which this invention can be used is the irrigation, protection and nutrition of vegetation for golf course, parks and other landscaped areas, to enhance the growth and physical condition of the vegetation of the course or park.

16 Claims, 2 Drawing Sheets

CLOSED APPARATUS SYSTEM FOR IMPROVING IRRIGATION AND METHOD FOR ITS USE

CROSS-REFERENCE TO RELATED APPLICATION

This application is a continuation-in-part of application Ser. No. 07/782,437, filed Oct. 25, 1991.

BACKGROUND OF THE INVENTION

1. Field of the Invention

This invention relates to methods and apparatus for enhancing water quality. More particularly, it relates to methods and apparatus for providing improved irrigation to vegetation in open areas such as parks and golf courses.

2. Description of the Prior Art

In the past it has commonly been the practice in many cases to manage golf course and park horticulture by what is known as the "sterile field" technique. It is well known that soils contain a wide variety of microorganisms of different types, some of which are beneficial to the plants and grass and others of which are harmful; see Grey et al., eds., *The Ecology of Soil Bacteria*, (University of Toronto Press: 1968). Since the various mixtures of microorganisms in the different soils are highly complex and vary widely from soil to soil and region to region, it has become common in golf course and park maintenance to apply biocidal materials to sterilize the soil by killing all of the bacteria and other microorganisms, including both harmful and beneficial species. Thereafter, once the biocidal activity has dissipated, the park or golf course manager applies fertilizers, nutrients and beneficial microorganisms to the soil and to some extent maintains an ongoing replenishment of these materials to attempt to keep the soil, grass and other shrubbery of the park or golf course in the desired good condition.

This type of soil management, even though believed generally beneficial, actually causes several problems, some of which are only now beginning to become evident. First, it forces the soil and local vegetation to become dependent upon the application of the chemicals and organisms by the maintenance personnel. In many cases the soil managers do not or cannot know the optimum nutrient and biological requirements of the local soil and vegetation, and therefore the chemical and microorganism materials provided do not supply the optimum nutrition and growth potential to the vegetation.

Further, it has been found that there are a number of soil and vegetation diseases which proliferate only in the sterile soil environment, so much effort must be expended to combat the incursion of these diseases.

There are also many microorganisms in soil which are neither exclusively harmful nor beneficial, but rather play a mixed roll depending on the type of soil and vegetation involved. Thus eliminating all naturally-occurring microorganisms and concentrating solely on the artificial application of "helpful" organisms often leaves the soil and vegetation deprived of the "mixed effect" organisms.

Further, in open areas it is impossible to prevent the re-incorporation into the soil of many of the naturally-occurring organisms which were removed by the sterile field technique initially. Consequently, the golf course or park manager must periodically again sterilize the soil and restart the nutrient supply process.

In addition, in almost all areas of the country incoming water contains dissolved salts, especially sodium salts, which pass through the irrigation system and are deposited onto the soil. The incorporation of such salts into the soil causes the soil to become less porous and receptive to irrigation (more "closed"), and to cause more water to run off and less to be taken up into the soil, such that continuously increasing quantities of irrigation water must be put onto the soil to accomplish satisfactory irrigation of the vegetation. One aspect of this is a particular problem in the arid parts of the United States, such as the West and Southwest, where water is scarce and costly and must be used as efficiently as possible. A converse aspect of the increased need for water to irrigate the closed soils is a particular problem in the wet parts of the United States, such as the South and East, where the excess run-off from poorly utilized irrigation water often poses serious soil erosion problems. In all parts of the country the excess run-off also carries away fertilizes and nutrients which are laid but do not penetrate the soil, resulting in economic waste and loss to the park or golf course owner and pollution of the catch basins and water courses where the run-off ends up.

In park and golf course maintenance, irrigation is a separate operation from fertilizer, nutrient and (where used) microorganism supply. The latter is normally conducted by manual broadcast or deposition on the soil of solid granulated fertilizers or bacterial materials, or such products are dissolved in water to make concentrated solutions or slurries which are manually sprayed onto the soil and vegetation. These operations are labor intensive, time consuming and put course and park workers in prolonged contact with large quantities of chemicals, so that they must be provided with protective clothing and equipment; all of these factors make such maintenance costly. Consequently, in practice it will be found that fertilizers and bacterial materials are only infrequently applied; that the manual applications are usually non-uniform, with numerous areas of the park or course receiving too little or too much material; that resupply of fertilizers and nutrients is performed too infrequently and intermittently to maintain a satisfactory level of viable microorganisms in the soil; and that workers may be at risk of harm when they neglect or refuse to wear and use the protective clothing and equipment furnished to them.

Further, as noted above, such broadcast and deposit methods, and also the spray methods where the soil is at least partially closed, results in fertilizers, nutrients and microorganisms which are merely laid on the surface of the soil. These do not penetrate into the soil and are susceptible to being washed away by irrigation water and rainfall, and in either case do not reach the target vegetation.

The net result of these considerations is that the parks and golf course vegetation does not get the frequent, regular, and optimum nutrition that is needed to produce and maintain healthy, lush and attractive vegetation and to result in a cost effective and economically viable golf course or park operation.

In golf course and park land irrigation, there often may be a relatively large water supply reservoir (such as a pond or lake) from which water is drawn during each day for irrigation and which is replenished as needed, often every night. Over the course of time the content of harmful salts and organisms increases in the water and these materials deposit on the reservoir sides and bottom so that periodically the reservoir much be drained and cleaned, so the water when used will not transfer those harmful organisms and contaminants to the soil or vegetation of the golf courses or parks. In addition, the bottom portion of the water (often extending upward some distance) tends to become depleted in oxygen by various mechanisms. Consequently, this region of oxygen depletion also tends to accumulate anaerobic microorganisms, many of which are harmful to soil and vegetation. Commonly water treatment plants deal with these problems by circulating the water and aerating it. However, in the golf course and park operations, there is usually not sufficient water retention time to provide adequate aeration and water turnover as one finds in commercial water treatment plants. Consequently, when the water is subsequently pumped out of the ponds for the golf course or park irrigation, it usually carries with it some amount of various dissolved salts and anaerobic organisms which are carried to the water irrigation intake by circulation within the pond. The subsequent deposition of these salts and microorganisms is of course detrimental to the soil and vegetation.

In my related patent application referred to above, I described and claimed a system whereby such reservoirs could be continually cleaned of salts and harmful bacteria (such as anaerobes) and maintained with various beneficial microorganisms, such that the irrigation water being drawn from them would be or approach optimum for the irrigation of the soil and vegetation.

In many cases, however, parks and golf courses do not have such irrigation ponds or lakes, particularly in arid regions where the evaporation rate results in excessive water loss and makeup requirements. In some areas, such as the regions of California and the Southwest which have experienced drought conditions for the past several years, many municipalities have restricted or prohibited water make-up to open ponds because of the high loss rates. Consequently, it has become necessary to develop closed systems where water loss is minimized. Not only does a closed system prevent exposure of the water to the ambient air until it is actually applied to the vegetation, but unlike an open pond, which is exposed at all hours, a closed system can be operated only at the times of minimum evaporation, which is usually in the early morning hours. Further, closed systems have the advantage that they are free of contamination by unwanted microorganisms which could be deposited in an open pond by wind, rain, animals or other means. Consequently, it would be of advantage to have a closed system which retains all of the benefits of my previously described open system but which avoids the problems of open systems which I have just mentioned.

SUMMARY OF THE INVENTION

The invention herein includes a method and apparatus for providing improved irrigation to vegetation in open areas such as parks and golf courses, including providing improved microbiotic and nutrient supplies to such vegetation in a non-sterilized environment. In its method aspects, the invention comprises combining in an aqueous slurry effective amounts of oxygen-generating first microorganisms, soil enhancing second microorganisms, enzymes and nutrients for the first and second microorganisms, allowing the combined microorganisms to grow in a closed reservoir to reach levels of concentrations of the first and second microorganisms effective for irrigation, enhancement and nutrition of vegetation, and then applying the concentrated materials to the vegetation in a water slurry in quantities sufficient to effectively irrigate and provide nutrition to the vegetation and to provide it with protection against harmful microorganisms.

In its apparatus aspects, the invention comprises a first supply tank containing a water slurry of an oxygen-generating first microorganism; a second supply tank containing a water slurry of a soil enhancing second microorganism; a third supply tank containing a water slurry of enzymes and nutrients for the first and second microorganisms; a first conduit to convey supply water, the first and second slurries and the enzymes and nutrients into at least one enhancement tank, the enhancement tank adapted to retain the combined materials for a time sufficient for the first and second microorganisms to increase in concentration to a point where they provide a significant degree of nutrition and protection against harmful microorganisms to vegetation to which they are applied; and conduit means to convey the slurry containing the concentrated first and second microorganisms from the enhancement tank to the vegetation and to apply it to the vegetation in effective quantities. Preferably there will be more than one enhancement tank, and means are provided to permit their sequential use, with one tank supplying the concentrated slurry to the vegetation while the microorganisms are being retained in the other tank for increase in concentration, and means to switch between the two tanks when the slurry in one tank becomes depleted and needs to be recharged.

Typical of the applications for which this invention can be used is the irrigation, protection and nutrition of vegetation for golf course, parks and other landscaped areas. When used for parks and golf courses, one of the desirable results is the enhancement of growth and physical condition of the vegetation of the course or park. The use of this invention allows the more efficient use of fertilizing materials with resultant improvement in the cost-effectiveness of operation of the facility.

BRIEF DESCRIPTION OF THE DRAWINGS

FIG. 1 is a schematic representation of a closed golf course or park irrigation system embodying the method and apparatus of the present invention.

FIG. 2 is a schematic representation of an alternative arrangement of one portion of the apparatus of the present invention.

DETAILED DESCRIPTION AND PREFERRED EMBODIMENTS

The process and apparatus of the present invention provide a simple and effect way of irrigating, protection and enhancing vegetation in such areas as golf courses and parks and also provide means for dispersing soil adjuvants to the soil and vegetation of the park or golf course in a regular, uniform and frequent manner, such that normal ecological balance of microorganisms and other soil materials is maintained and the soil need not be sterilized in order to maintain a healthy, attractive and flourishing soil and vegetation system for the golf course or park.

The system is best initially understood by reference to the drawings. Considering first FIG. 1, which is a schematic diagram illustrating the various components of the system (the system being generally designated 2), water from a conventional water source (not shown) enters the system through supply line 4. The water supply will be from the normal sources for golf course and parks, commonly municipal water supplies, which may either be potable water or "gray water" recycled from municipal sewage after some limited sewage treatment. Such water supply is normally provided under ordinary municipal pipeline pressures, although if desired the water can be pumped from a supplemental holding tank or pond (not shown) to line 4, if municipal water pressure is inadequate or if direct access to the municipal supply is not possible. The flow of the input water in line 4 to the system is controlled by pump 6.

The feed system 2 is controlled overall by a computer or controller 8, which is programmed to direct the opening and closing of valves 16, 18 and 50 and operation of pumps 6, 42, 54 and 64, as indicated by the dotted lines 86 in the schematic Figure and as will be described below.

Pump 6 supplies water through line 10 to lines 12 and 14, which contain valves 16 and 18, respectively. Water in line 12 is passed through valve 16 and line 20 into tank 22 (shown partially in cut-away), which is the initial main supply tank for the soil enhancing microorganisms (to be described below). In a typical golf course system tank 22 has a 110 gallon (420 liter) capacity. Within tank 22 is a floating control valve 24 which maintains the level of bacteria-containing slurry 26 at a desired point. Suspended in a porous container 28 below the valve 24 is a soluble block of microorganisms, which slowly dissolves to maintain a generally uniform concentration of microorganisms in the slurry 26. Tank 22 has a removable top 30 so that the tank can be serviced as needed.

Two other tanks (labeled 32 and 34) are used in the system. Both are batch tanks, rather than continuous tanks as is tank 22. In a typical golf course system tanks 32 and 34 each may have a 55 gallon (210 liter) capacity, although tank 34 is often smaller. Tank 32 holds a supply of water slurry which contains oxygen-supplying microorganisms. This material is normally obtained commercially in slurry form or can be externally mixed, and tank 32 is periodically refilled as needed through removable top 36. Similarly, tank 34 holds a supply of water slurry which contains enzymes and nutrients for the microorganisms in tanks 22 and 32; the enzymes and nutrients can be contained in the same slurry since they are compatible. As with the slurry in tank 32, the slurry in tank 34 is normally obtained commercially in slurry form or may be mixed externally, and tank 34 is periodically refilled as needed through removable top 38.

Tank 34 discharges its enzyme/nutrient slurry through line 40 by means of pump 42 through line 44 to a junction with line 46. Line 46 also receives microbial slurry from tank 22 through discharge line 48 which is controlled by valve 50. Line 46 in turn discharges into line 52, which contains fresh water drawn from line 20 through line 54 be means of pump 56. Line 52 feeds into tanks 58, which are preferably a plurality of substantially identical tanks here exemplified as designated 58a and 58b. Which tank 58 is being filled at any time will be determined by diverted valve 59, which directed the liquid flow alternately into lines 60a and 60b, supplying tanks 58a and 58b respectively. Commonly the liquids are pumped through screens, spargers or baffles 61 within the tanks 58. The functions of tanks 58 will be further discussed below.

Tank 32 discharges its microbial slurry through line 62 by means of pump 64 into line 66, which in turn discharges into line 68 which is downstream from valve 18, and in which it can be combined with fresh water when valve 18 is open. The water/slurry passes through line 68 to diverter valve 62 which alternatively directs the flow into lines 63a and 63b supplying tanks 58a and 58b respectively. The maximum liquid level in the tanks 58 is controlled by a conventional liquid level sensor (not shown) which provides a signal to computer or controller 64 which in turn operates valves 59 and 62 through signal line 65 to divert liquid flow to a different tank of the plurality of tanks 58 or closes valves 59 and 62 to temporarily halt liquid flow entirely.

Additional make-up water, from the same or a different source than that of line 4, can be provided to one or more of the tanks 58 through line 66, diverter valve 67, and supply lines 68a and 68b. Valve 67 is also controlled by controller or computer 64 through signal line 69.

Once passed to a tank 58 from tanks 22, 32 and 34, the initial microorganism slurries remain in the tank 58 for a period of time sufficient to enable the concentration of the microorganisms to increase substantially. Normally this period is at least about one hour, and preferably at least about twenty-four hours or more. The enhancement in concentration which takes place in the tanks 58 is equivalent to the enhancement which takes place in the retention pond in the system described in my related patent application, but since the present system is closed no foreign microorganisms or other harmful or unwanted materials can enter the liquid slurries while concentration of the desired microorganisms increases, nor is there any water loss by evaporation or seepage. Thus the advantages of t he pond of the prior system are retained while avoiding water loss.

If desired air can also be pumped into a tank 58 through line 70 by pump 72 and dispersed in the slurry through sparger 61 to aerate the slurry within the tank and increase its oxygen content. Since the air will not be fully soluble in the slurry, it will be necessary to provide a relief valve 71 in the top of the tank 58 to prevent excessive air pressure build-up within the tank.

Thereafter, when desired and normally on a predetermined schedule, enhanced slurry is pumped out of a tank 58 through a line 73 (illustrated as 73a or 73b) and through diverter valve 75 by pump 77 in line 81. The liquid flows through line 81 to a second diverter valve 83 from which it is directed to wet well 89 through line 85 or through line 87 to irrigation line 79. If sent to wet well 89 for temporary retention, it is subsequently pumped by pump 76 through line 74 into irrigation line 79. The presence of wet well 89 allows for further close control of the scheduling of application of the irrigation water to vegetation through the sprinkler systems described below. Pump 77 and diverter valves 75 and 83 are also controlled by controller 64 through signal lines 91 and 93 in response, in part, to the flow rate information provided by flow meter 95.

The enhanced slurry passes either directly into irrigation line 79 through line 87 or is pumped from wet well 89 by pump 76 into irrigation line 79 and through distribution system 78 where it flows to various groups of sprinklers 80. The flow to each separate group is controlled by valves 82 in distribution lines 84. A computer or controller 88 controls distribution system 78 by means of valves 82 and pump 76 as indicated by dotted lines 90.

Figure 2:
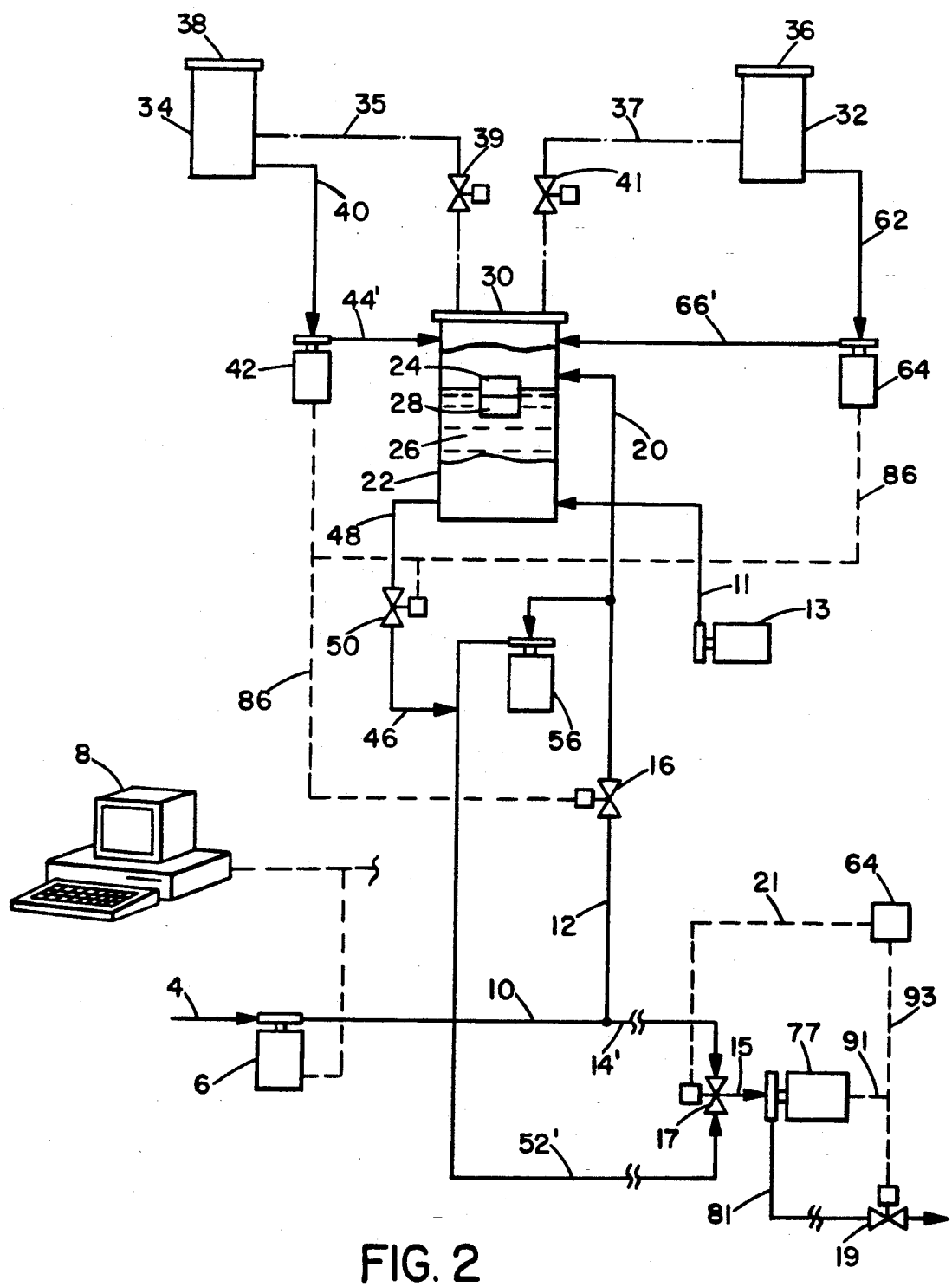

Alternative arrangements of a portion of the apparatus of this invention are illustrated in FIG. 2. One principal change is that tanks 32 and 34, instead on discharging independently into lines 46 and 68, discharge directly into tank 22. All the materials are therefore mixed in tank 22. In one alternative, the tanks 32 and 34 discharge into tank 22 through, respectively, line 62, pump 64 and line 66', or line 40, pump 42 and line 44'. This alternative uses essentially the same equipment as the system of FIG. 1. In a more preferred embodiment, the tanks 32 and 34 are positioned at a higher level than tank 22, so that the can discharge by gravity into tank 22, thus eliminating the need for the pumps 42 and 64 and the lines 40, 44', 62 and 66'. This alternative is illustrated in FIG. 2 by the phantom lines 35 and 37, which each has a control valve 39 and 41 respectively. The control valves 39 and 41 would be operated by computer 8, in the same manner that pumps 42 and 64 are controlled.

Also shown in FIG. 2 is the optional use of air pump 13 to pump air through line 11 into tank 22 to aerate the slurry in the tank 22. Aeration of the slurry in the tank 22 allows for the possibility of by-passing the tanks 58 and delivering the aerated microorganism-containing slurry directly to the irrigation system. This is illustrated in FIG. 2 where lines 14' and 52' are shown merging into a single line 15 at mixer valve 17. Line 15 discharges into pump 77, from which the slurry is passed into the irrigation system as previously described for FIG. 1. Valve 17 may be controlled by computer 64 as indicated by dotted line 21. If the lines or conduits 14,, 52, or 15 are long enough, they may serve as a holding chamber for mixed slurry, thus allowing more slurry to be produced in tank 22 while the slurry already in the conduits is held for the next irrigation application cycle.

The computers or controllers 8, 64 and 88 may be different devices, located in the same or different locations, or the same computer or controller may handle all functions. The computers/controllers 8, 64 and 88 will be programmed to operate the system 2 such that the desired quantities and concentrations of the two groups of microorganisms (from tanks 22 and 32) and the enzymes and nutrients (from tank 34) are provided to the distribution system 78. The precise amounts of each material, the time of supply to the distribution system 78, and the order in which each branch of the distribution system is supplied will be determined by a number of factors, including the type of park or course vegetation and soil, the volume of the tanks 58, the specific microorganisms, enzymes and nutrients being used, and the tine of year. Park and golf course supervisors and others skilled in the art of park and course maintenance will have no difficulty determining the appropriate schedule of operation for each specific park or course at any time of the year with no more than minimal experimentation.

In particular, computer/controller 88 is programmed to run distribution system 78 according to the irrigation requirements of the specific course or park, including such factors as the type of vegetation and soil, the drainage and exposure of the different parts of the course or park, and the time of year. While water/irrigation distribution systems have in the past been run by computer programs which incorporate such factors, those supervisors and others skilled in the art are likely to find that their current distribution programs need to be reconsidered when using the system 2 of this invention, since after an initial use period of several weeks or months, the growth and health of the vegetation and the quality of the soil on their courses or parks will have so significantly improved that the irrigation schedule can be revised and optimized.

The exact mechanism of operation of the system is not known, since the materials used contain many different strains and genera of microorganisms. It is believed, however, that certain of the various microorganisms supplied from tanks 22 and 32 serve to destroy and eliminate the anaerobic bacteria which would otherwise accumulate in irrigated soil and thereafter to prevent any substantial buildup of such anaerobes, and that certain other microorganisms supplied from tanks 22 and 32 provide sources of nitrogen and other components to enhance vegetation and soil conditions. The presence of the enzymes and nutrients is critical, since the irrigation system is used daily and the microorganisms in the enhancement tanks 58 and subsequently distributed to the soil and vegetation through the distribution system 78 must be constantly fed in order for them to provide the ongoing and increasing enhancement of the soil and vegetation which this system produces. If the enzymes and nutrients are not constantly provided as part of the regular operation of the system, then the microorganisms applied to the vegetation and soil will quickly die and the unsatisfactory conditions of the prior art techniques will prevail.

It is anticipated that in typical cases, the use of the improved and bacterial-material enhanced water on the course vegetation on a standard eighteen-hole golf course over a period of about 2-4 months of daily application produces substantially enhanced vegetation, with improved root systems, better coverage, substantial elimination of "sterile soil" diseases, and (in the case of grass) improved resistance to the normal abuse of golf swings, golf carts and golf shoes. Thereafter maintenance of the improved turf, shrubbery, trees and other vegetation and soil becomes routine. It is usually found that the maintenance quantities of the microorganisms, nutrients and nutrients will be somewhat less than the quantities needed initially to correct the sterile soil and poor pond conditions. However, the correct quantities for each course or park at any given level of improvement or maintenance will be readily determined by the supervisors or other skilled course workers.

The various materials which are useful herein are commonly mixtures of a variety of microorganisms, and frequently are commercially sold as proprietary combinations. However, those skilled in the art will be able to determine appropriate materials by selecting those which provide the functions of oxygen-supply and salt affinity.

The microorganisms which will be designated "soil enhancing" and which are contained in tank 22 are exemplified by a microbial product commercially available under the trade name "Bao-Terra" ™ from Fifoo International, Inc of Del Mar, Cal. This is a proprietary material described as containing nitrifying bacteria, thermophilic bacteria and oxygenating bacteria. Microorganisms which it is believed will be satisfactory as the material in tank 22 are those which include thermophiles as archaebacteria, described in Brock et al., *Biology of Microorganisms* (5th edn., 1988) §18.6; microorganisms which utilize hydrocarbons as nutrients, such as pseudomonas and mycobacterium (Brock et al., §16.23); nitrogen fixating bacteria such as *azotobacter spp. cyanobacteria and bacillus polymyxa* (Brock et al., §16.24); and halophiles such as halobacterium Brock et al., §19.33). Those microorganisms useful as the oxygen-generating bacteria supplied from tank 32 are exemplified by a microorganism product commercially available under the trade name "AG-14" from Natural Oxygen Products of El Paso, Tex., and described in U.S. Pat. No. 3,855,121. Similar products which it is believed will be equivalent to the "AG-14" material include *pseudomonas, flavobacterium, bacilluus polymyxa and bacillus sphaericus*, described respectively at Brock et al., §§19.15, 19.20, and 19.26 (the two *Bacillus spp.*), as well as *euglina spp.*, described in Moore et al., *Biological Science* (1963), pp. 248-249. Various known microbial nutrients and enzymes can be supplied from tank 34. These are exemplified by a product commercially available under the trade name "BNB-931" from Westbridge Company of Carlsbad, Cal., and a chelated product commercially available under the trade name "Sun-Up"; in this product the chelating agent is citric acid.

It is not known with certainty why the materials used in this invention are so effective. It is believed, however, that to some extent it involves the formation of polysaccharides as by-products of the growth of the beneficial microorganisms in the soil. The polysaccharides complex with humus and organic matter and enhance the ability of the soil particles to aggregate. The aggregation of the soil improves the soil porosity and permits an increase in average soil temperature, to facilitate capture, retention and growth of water, microorganisms and nutrients. Acidity of the soil may also be decreased.

There are a number of typical tests which can be used to monitor the improvements which occur in soils to which the microbial products are administered in accordance with this invention. These include pH analysis, soil nutrient analysis, temperature monitoring, odor testing and microbial population plate counts.

While the above system has been described in terms of golf courses and parks, it will be evident that it has application and utility in other areas where enhancement and improvement of vegetation is desired. For instance, one could use this system in enhancing new growth of vegetation in areas where there are new plantings, such as the landscaping following construction of buildings, roads or the like. It could also be used in enhancing new growth in areas swept by fire, such as the residential area of the Oakland/Berkeley Hills in California destroyed by a brush fire in 1991.

It will be apparent that there are numerous embodiments of this invention which, while not expressly described above, are clearly within the scope and spirit of the invention. Therefore the above description is to be considered exemplary only, and the actual scope of the invention is to be limited solely by the appended claims.

I claim:

1. Apparatus for providing improved microbiotic and nutrient supplies to vegetation in a non-sterilized environment; which comprises:

vessels containing water slurries of an oxygen-generating first microorganism, a soil enhancing second microorganism, and enzymes and nutrients for the first and second microorganisms;

at least one substantially enclosed enhancement vessel;

a first conduit to convey supply water and said slurries into said at least one enhancement vessel, said enhancement tank providing means to retain the combined materials for a time and under conditions sufficient for said first and second microorganisms to increase in concentration to a point where they provide a significant degree of nutrition and protection against harmful microorganisms to vegetation to which they are applied; and second conduit means to convey the combined discharge slurry containing said concentrated first and second microorganisms from said enhancement vessel to said vegetation; and application means to apply said slurry containing said microorganisms to said vegetation in effective quantities.

2. Apparatus as in claim 1 wherein said first and second microorganisms and said enzymes and nutrients are initially slurried in water in separate vessels and then combined in a single vessel.

3. Apparatus as in claim 2 wherein said single vessel is one of the vessels in which one of the components was initially slurried.

4. Apparatus as in claim 3 wherein said single vessel also contains means for retaining a solid soluble mass of said first microorganism, which mass is adapted to dissolve at a given rate and meters said first microorganism into said liquid to form said slurry.

5. Apparatus as in claim 3 wherein said single tank comprises a chamber for said combined water slurry, a connection with a source of supply water and regulating means to permit sufficient supply water to enter said chamber to maintain a generally constant volume of liquid in said chamber as slurry is withdrawn from said chamber and passed to said irrigation system.

6. Apparatus as in claim 2 wherein said single vessel also comprises an enhancement vessel.

7. Apparatus as in claim 1 comprising a plurality of said enhancement vessels and switching means adapted to permit their sequential use, whereby one vessel supplies said discharge slurry to said vegetation while said microorganisms are being retained in at least one other tank of said plurality for enhancement of concentration, said switching means operable to switch between said two tanks when the slurry in one tank becomes depleted.

8. Apparatus as in claim 7 wherein said first and second microorganisms and said enzymes and nutrients are initially slurried in water in separate vessels and then combined in a single vessel, said single vessel subsequently discharging into said at least one enhancement vessel.

9. Apparatus as in claim 1 further comprising pumps to move slurries through said conduits and control means adapted to regulate the operation of each of said pumps to regulate the flow of said slurries and said supply water in said conduits.

10. Apparatus as in claim 9 wherein said control means comprises an activation and speed controller on each said pump, valves in each conduits and a programmable computer operably connected to said activation and speed controllers and valves, and operating software acted on by said computer to determine the time and speed of operation of each said pump and the operation of each said valve according to a predetermined measure of the desired effective level of said first and second microorganisms, enzymes and nutrients to be maintained in said slurry.

11. Apparatus as in claim 1 wherein said application means comprises means for dispersing said slurry at a remote location.

12. Apparatus as in claim 11 wherein said location is at least a portion of a golf course or park and said dispersing is conducted by forcing said slurry through at least one spray device directing spray onto said portion of said golf course or park.

13. A method of providing improved microbiotic and nutrient supplies to vegetation in a non-sterilized environment; which comprises combining in an aqueous slurry effective amounts of oxygen-generating first microorganisms, soil enhancing second microorganisms, enzymes and nutrients for said first and second microorganisms, allowing said combined microorganisms to grow in a closed reservoir to reach levels of concentrations of said first and second microorganisms effective for irrigation, enhancement and nutrition of vegetation, and then applying said concentrated materials to said vegetation in a water slurry in quantities sufficient to effectively irrigate and provide nutrition to said vegetation and to provide said vegetation with protection against harmful microorganisms.

14. A method as in claim 13 wherein said vegetation is in a park or golf course.

15. A method as in claim 13 wherein said first microorganism is selected from the group consisting of *pseudomonas, flavobacterium, bacillus polymyxa, bacillus sphaericus, and euglina spp.*.

16. A method as in claim 13 wherein said second microorganism is selected from the group consisting of *archaebacteria, pseudomonas, mycobacterium, azotobacter spp.. cyanobacteria, bacillus polymyxa and halobacterium.*

* * * * *